US009936135B2

(12) United States Patent
Karlsson Jägerman et al.

(10) Patent No.: US 9,936,135 B2
(45) Date of Patent: Apr. 3, 2018

(54) LOCKING DEVICE

(71) Applicant: Axis AB, Lund (SE)

(72) Inventors: Andreas Karlsson Jägerman, Södra Sandby (SE); Stig Frohlund, Hässleholm (SE)

(73) Assignee: Axis AB, Lund (SE)

( * ) Notice: Subject to any disclaimer, the term of this patent is extended or adjusted under 35 U.S.C. 154(b) by 30 days.

(21) Appl. No.: 15/286,232

(22) Filed: Oct. 5, 2016

(65) Prior Publication Data
US 2017/0118410 A1    Apr. 27, 2017

(30) Foreign Application Priority Data
Oct. 22, 2015   (EP) ..................................... 15191095

(51) Int. Cl.
H04N 5/228    (2006.01)
H04N 5/232    (2006.01)
H04N 5/225    (2006.01)
G03B 5/00     (2006.01)

(52) U.S. Cl.
CPC .......... *H04N 5/23267* (2013.01); *G03B 5/00* (2013.01); *H04N 5/2253* (2013.01); *H04N 5/2254* (2013.01); *H04N 5/2328* (2013.01); *H04N 5/23287* (2013.01); *G03B 2205/0038* (2013.01)

(58) Field of Classification Search
CPC ............. H04N 5/23248; H04N 5/2328; H04N 5/23264; G03B 5/00; G03B 2205/0007; G03B 2205/0069; G02B 27/646; G02B 7/026
See application file for complete search history.

(56) References Cited
U.S. PATENT DOCUMENTS

| 5,153,633 | A  | 10/1992 | Otani |
| 5,881,325 | A  | 3/1999  | Imura et al. |
| 6,768,587 | B2 | 7/2004  | Hirunuma et al. |
| 7,848,638 | B2 | 12/2010 | Senba |
| 7,957,631 | B2 | 6/2011  | Chang |
| 8,441,725 | B2 | 5/2013  | Yasuda |
| 2007/0053684 | A1 | 3/2007 | Iwasaki et al. |
| 2007/0093108 | A1 | 4/2007 | Nemoto et al. |

(Continued)

FOREIGN PATENT DOCUMENTS

| EP | 2 605 510 A1 | 6/2013 |
| JP | 2002 290816 A | 10/2002 |

(Continued)

OTHER PUBLICATIONS

EP 15 19 1095 European Search Report (Jan. 29, 2016).

*Primary Examiner* — Sinh Tran
*Assistant Examiner* — Selam Gebriel
(74) *Attorney, Agent, or Firm* — Volpe and Koenig, P.C.

(57) ABSTRACT

A locking device for locking an image sensor element in a camera, a camera comprising such a locking device, and a method for controlling image stabilization in a camera comprising such a locking device are disclosed. The locking device comprises two locking arrangements which are superimposed such that one or more locking holes of the locking arrangements at least partly overlap each other in pairs so as to form two open sections adapted to each receive a locking protrusion. The locking device is adjustable between a locked mode and an unlocked mode.

15 Claims, 6 Drawing Sheets

(56) References Cited

U.S. PATENT DOCUMENTS

| | | | |
|---|---|---|---|
| 2009/0122421 A1 | 5/2009 | Sakamoto et al. | |
| 2010/0157074 A1* | 6/2010 | Kawai | G02B 7/003 |
| | | | 348/208.7 |
| 2011/0026908 A1* | 2/2011 | Nishimura | G02B 27/646 |
| | | | 396/55 |
| 2013/0163973 A1 | 6/2013 | Tanaka | |
| 2014/0078330 A1* | 3/2014 | Uenaka | G03B 5/00 |
| | | | 348/208.11 |

FOREIGN PATENT DOCUMENTS

| | | | |
|---|---|---|---|
| JP | 2014 089264 A2 | 5/2014 | |
| JP | 2015 004769 A2 | 1/2015 | |

\* cited by examiner

LOCKING DEVICE

FIELD OF INVENTION

A locking device for a camera is disclosed. The locking device provides a locked mode and an unlocked mode for an image sensor element arranged in the camera. Image stabilization may be enabled when the image sensor element is unlocked. Methods for controlling image stabilization in a camera comprising such a locking device are also disclosed.

BACKGROUND

Image stabilization is well known in the art of image acquiring. Image stabilization means to compensate for movement of the image acquiring device when acquiring an image. The image acquiring device may be a still camera or a video camera, and could be for example a surveillance camera.

There are two main technical principles for image stabilization: electrical image stabilization and optical image stabilization.

Electrical image stabilization is a software based technique where the acquired image is digitally modified or displaced in order to reduce the effect of movement in the camera. Optical image stabilization means that a physical component in the camera is shifted opposite to a detected movement of the camera. The component is thereby stabilized in relation to the camera's field of view. The stabilization is applied to either a lens element (referred to as lens-based stabilization) or an image sensor element (referred to as in-camera stabilization or sensor stabilization).

One example of a technique for optical image stabilization is provided in U.S. Pat. No. 5,881,325. In this document, a correction lens may be locked by a locking device comprising a solenoid.

SUMMARY

A locking device for an image sensor element in a camera is disclosed. A purpose of the locking device is to enable a locked mode for the image sensor element. By locked mode is meant that movement of the image sensor element in its plane is prevented.

It has been identified that it may be desirable to enable locking of the position of an image sensor holder when for example aligning and attaching an image sensor board to a board holder, or when transporting a device containing the image sensor holder.

It has also been identified that it is desirable to provide a power efficient solution for reducing power consumption and heating, in particular for in-camera stabilization arrangements such as sensor stabilization.

Another purpose of the locking device is to enable, in addition to the locked mode, an unlocked mode for the image sensor element in which sensor stabilization is allowed. In the unlocked mode, sensor stabilization is enabled by allowing movement of the image sensor element in its plane.

It is thus objects of the disclosure to provide a locking device which can provide both a locked mode and an unlocked mode for an image sensor element and which has the potential to reduce power consumption and reduce heating in view of prior art solutions for sensor stabilization.

According to a first aspect, a locking device according to claim 1 is provided, that is a locking device for locking an image sensor element in a camera, the locking device comprising: two locking arrangements each provided with one or more locking holes; wherein the locking arrangements are superimposed such that said one or more locking holes of the locking arrangements at least partly overlap each other in pairs so as to form two open sections adapted to each receive a locking protrusion of said image sensor element; wherein the locking device is adjustable between a locked mode and an unlocked mode by a motion of the locking arrangements relative each other; wherein, in the locked mode, the open sections of the locking arrangements are adapted to receive the respective locking protrusion such that the locking arrangements engage with each locking protrusion for locking the position of the image sensor element relative the locking arrangements in an image sensor plane of the image sensor element; and wherein, in the unlocked mode, the open sections of the locking arrangements are adapted to receive the respective locking protrusion such that the locking arrangements are disengaged from the respective locking protrusion for allowing adjustment of the position of the image sensor element relative the locking arrangements in the image sensor plane of the image sensor element.

The locking device provides an unlocked mode of the image sensor element. In the unlocked mode, the image sensor element is allowed to move in an image sensor plane. The image sensor plane is defined as the sensor plane of the image sensor element. In the unlocked mode, the image sensor element may be adjusted by sensor stabilization.

The locking device also enables a locked mode, in which the image sensor is prevented from moving in its plane. This mode may be utilized for disabling sensor stabilization. This mode may also be utilized for locking the image sensor element in position during, e.g., mounting of the camera components.

The adjustment of the locking device may be performed by use of powered actuators, such as a motor. However, when the locking device is adjusted to either one of the locked or unlocked mode, no powered actuator is required in order for the locking device to remain in that mode. Hence, the design of the locking device provides a power-efficient solution for locking and unlocking an image sensor element and contributes to minimization of heating in the camera.

The one or more locking holes may be wedge-shaped. In the locked mode, the open sections may be adapted to receive the respective locking protrusion such that each locking protrusion is wedged in the respective locking hole of each of the overlapping locking holes.

By wedging the locking protrusions, a firm engagement of the locking protrusions is achieved. Another advantage is that the locking protrusions are guided into the respective wedge when the locking arrangements are adjusted from the unlocked mode towards the locked mode. Thus, there is no need for any active guiding of the locking protrusions or of the locking arrangements. Moreover, the position of the locking arrangements in the locking device becomes well-defined in the locked mode. Thus, a predetermined reference position may be provided without the need for further components such as sensors.

According to one embodiment, the locking device further comprises: a support member comprising at least one guiding protrusion; wherein the locking arrangements are provided with a groove each; wherein the locking arrangements are superimposed such that the grooves at least partly overlap each other so as to form a common guiding groove adapted to receive the at least one guiding protrusion; and wherein the locking arrangements are adapted to engage with the at least one guiding protrusion when received in the common guiding groove.

Purposes of the support member are to support the locking arrangements and to guide the movement of the locking arrangements relative each other.

The at least one guiding protrusion may be elongated so as to extend along the common guiding groove when received in said common guiding groove.

The position stability of the locking arrangements may be improved by use of the support member. The design of the locking device in embodiments including the support member may provide a well-defined guided movement of the locking arrangements relative each other. Moreover, unwanted rotation of the locking arrangements may be counteracted.

According to one embodiment of the locking device, the locking protrusions protrude from the image sensor element mainly orthogonal to the image sensor plane.

According to one embodiment of the locking device, the locking protrusions are formed by locking pins. This may be advantageous from a manufacturing perspective.

According to one embodiment of the locking device, each locking arrangement is formed by an elongated member; and the locking arrangements are arranged such that the locking device is adjustable between the locked mode and the unlocked mode by a motion of the elongated members relative each other mainly along their extension direction. The locking device according to this embodiment may be made compact. The locking device may also be easy to assemble in that it may be formed by a small number of components.

According to one embodiment, the locking device further comprises: a fork element having two prongs; wherein each prong is coupled to a respective one of the locking arrangements such that the locking device is adjustable between the locked mode and the unlocked mode by a rotation of the fork element about a rotational axis of the fork element.

The locking device may further comprise a motor coupled to the fork element for rotation of said fork element.

According to a second aspect, a camera according to claim 10 is provided, that is a camera comprising a locking device according to any one of the above disclosed embodiments is provided.

According to one embodiment, the image sensor element comprises a board holder from which the locking protrusions protrude, and an image sensor board is mountable on said board holder.

According to one embodiment, the camera further comprises a controller operationally coupled to the locking device for enabling and disabling sensor stabilization by controlling the adjustment of the locking device between the unlocked mode and the locked mode.

According to a third aspect, a method according to claim 13 is provided, that is a method for controlling sensor stabilization in a camera comprising a locking device according to any one of claims 1-9, the method comprising: determining an image stabilization parameter; comparing the image stabilization parameter with a preset decision parameter, and based on said comparison, enabling sensor stabilization by adjusting the locking device to the unlocked mode or disabling sensor stabilization by adjusting the locking device to the locked mode.

According to one embodiment, the image stabilization parameter represents one or more of the following: movement level of the camera, power level of the camera, light intensity in a field of view for the camera, time of day or night, user input.

According to one embodiment, the method further comprises that if the sensor stabilization is disabled, electronic image stabilization is enabled.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. All references to "X [elements, devices, components, means, steps, etc.], where X is an integer being 2 or higher, are to be interpreted openly as referring to at least X instances of said elements, devices, components, means, steps, etc., unless explicitly stated otherwise. The steps of any method disclosed herein do not necessarily have to be performed in the exact order disclosed, unless explicitly stated.

BRIEF DESCRIPTION OF THE DRAWINGS

The above disclosed and other aspects of the present invention will now be described in more detail, with reference to the appended drawings.

DETAILED DESCRIPTION

Figure 1:
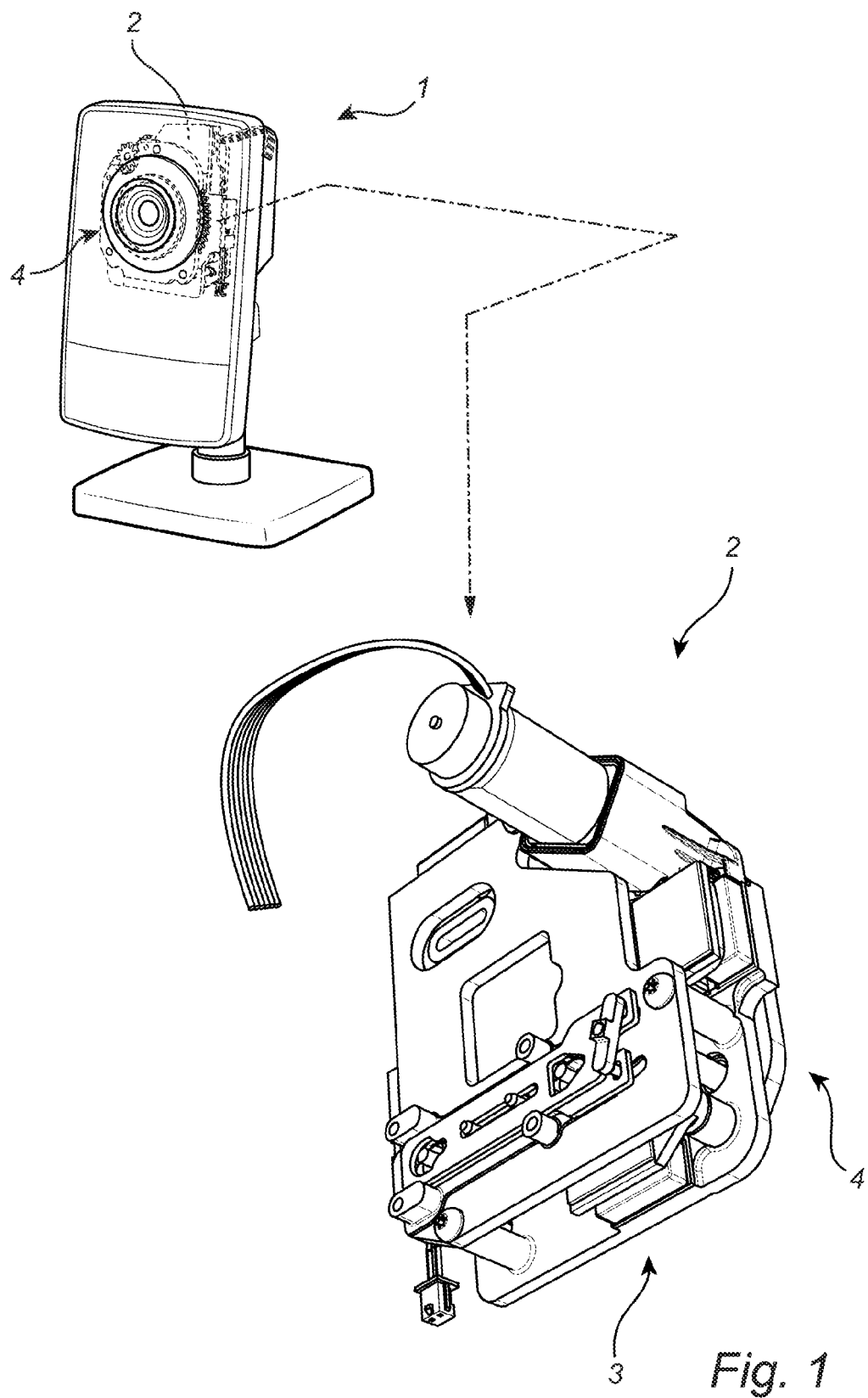
FIG. 1 illustrates a camera and a close-up of a part of the camera comprising a locking device according to an embodiment.

FIG. 1 illustrates a camera and a close-up of a part of the camera comprising a locking device according to an embodiment. The camera 1 comprises an imaging module 2. The camera 1 can be a fixed focus surveillance camera, or a varifocal surveillance camera, which is able to adapt its focus to objects at varying distances from the camera. In the case of a varifocal camera, this may or may not have zooming capabilities, and the zoom may be either manually or electrically controlled. The camera 1 may further be either fixed or movable in a pan/tilt fashion.

The imaging module 2, as seen from behind the camera 1, is illustrated in enlargement. The imaging module 2 comprises an imaging sensor module 3 and an imaging lens module 4. The imaging lens module 4 comprises lenses and other components for providing desired view properties for the camera's 1 field of view. The imaging sensor module 3 is provided for acquiring an image of the camera's 1 field of view captured through the imaging lens module 4. The imaging module 2 may be in the size region of 5×5 cm (width/height).

Figure 2:
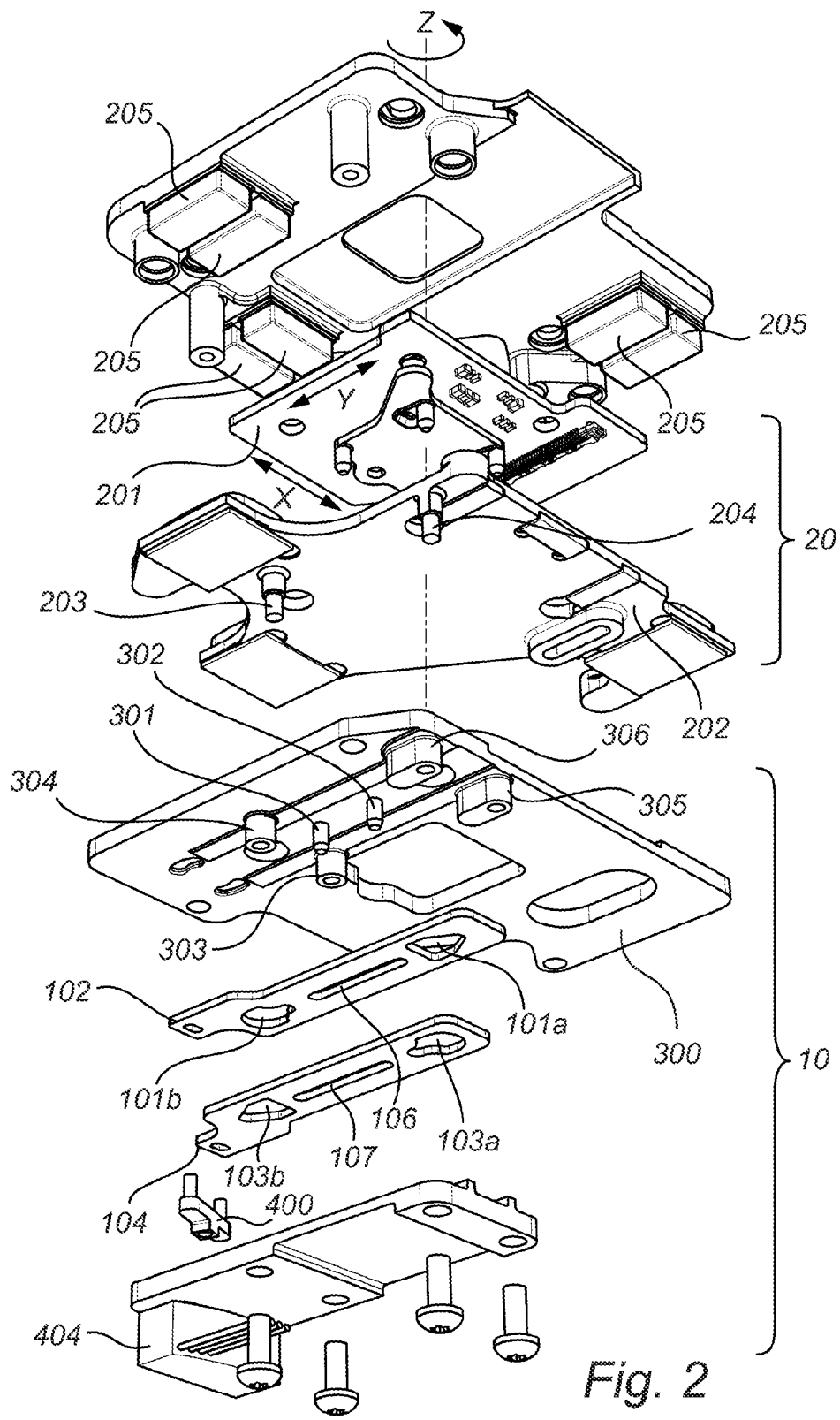
FIG. 2 is an exploded view of a part of the camera comprising an image sensor element and a locking device according to an embodiment.

FIG. 2 is an exploded view of parts of the imaging sensor module 3. The imaging sensor module 3 comprises a locking device 10 and an image sensor element 20.

The image sensor element 20 comprises an image sensor board 201 and a board holder 202. The image sensor board 201 is mounted on the board holder 202. The image sensor board 201 and the board holder 202 are typically plane members.

A stabilizer is connected to the image sensor element 20. The stabilizer is connected so as to actuate movement of the image sensor element 20 in an image sensor plane. In the illustrated embodiment, the stabilizer comprises magnets 205 which are utilized for actuating movement of the image sensor board 201.

The image sensor plane is defined as the sensor board plane of the image sensor element 20. In this plane, the sensor receives light entering the camera through the image lens module in order to acquire an image of the camera's field of view. Through-out this application, mutually orthogonal X- and Y-directions are defined as representing the image sensor plane and a Z-direction is defined as orthogonal to the X- and Y-directions. Typically, the image lens module extends from the image sensor element 20 in the Z-direction.

A controller (not illustrated in this Figure) is connected to the stabilizer for controlling the movement achieved by the stabilizer. The controller and stabilizer are adapted to achieve sensor stabilization. By detecting movement of the camera 1, by, e.g., a conventional vibration sensor, the controller may control the stabilizer to shift the image sensor element 20, in the image sensor plane, opposite the detected movement.

The imaging sensor module 3 further comprises a locking device 10. The locking device 10 comprises two locking arrangements. Each locking arrangement is in this embodiment formed by an elongated member. The elongated members are referred to as a first elongated member 102 and a second elongated member 104 for clarity purposes.

The first elongated member 102 is provided with a first pair of locking holes 101a, 101b. The second elongated member 104 is provided with a second pair of locking holes 103a, 103b. The locking arrangements are superimposed in a manner such that the pairs of locking holes 101a, 101b, 103a, 103b at least partly overlap each other in pairs. In this embodiment, the locking arrangements are superimposed such that the locking holes 101a, 103a overlap each other and such that the locking holes 101b, 103b overlap each other. By each overlapping pair of locking holes, an open section is formed. The open section is defined by the common area in each of the pairs of overlapping locking holes. The overlap of the locking holes 101a, 103a forms an open section 105a and the overlap of the locking holes 101b, 103b forms an open section 105b. Since the locking holes are formed by through holes of the elongated members, the open sections 105a, 105b are formed by openings extending through the elongated members.

Each of the open sections 105a, 105b receives a locking protrusion 203, 204 of the image sensor element 20. The locking protrusions 203, 204 form, in this embodiment, a part of the board holder 202. The locking protrusions 203, 204 protrude orthogonally in view of the plane of the board holder 202. For purposes of facilitating the manufacturing of the board holder 202, the locking protrusions 203, 204 are formed by locking pins with a circular cross-section.

Figure 3A:
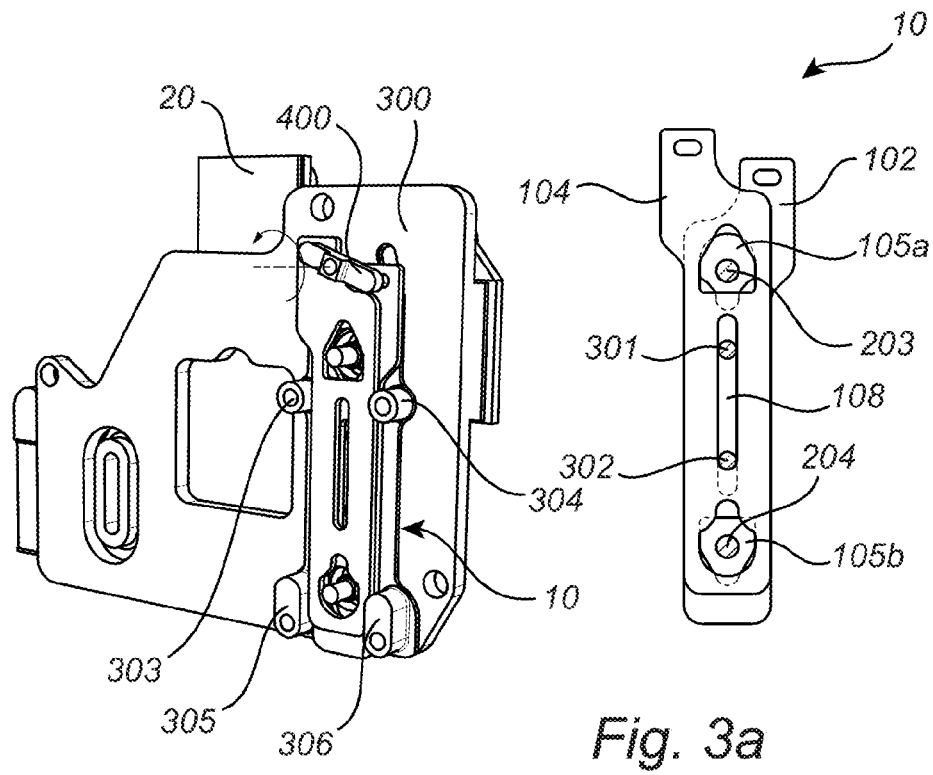
FIGS. 3a and 3b illustrate an unlocked mode and a locked mode of a locking device according to an embodiment.
Figure 3B:
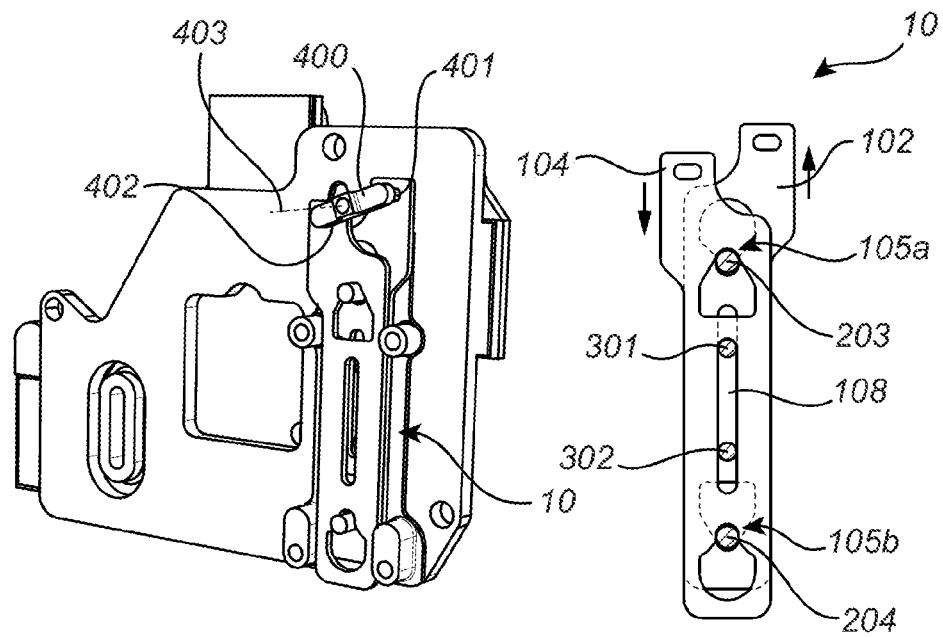

The locking mechanism of the locking device 10 will now be disclosed with further reference to FIGS. 3a and 3b. The locking device 10 is arranged to enable a locked mode and an unlocked mode. In FIG. 3a, the locking device 10 is arranged in the unlocked mode. In FIG. 3b, the locking device is arranged in the locked mode.

In FIG. 3a, the elongated members 102, 104 are positioned relative each other such that the open sections 105a, 105b receive the locking protrusions 203, 204 without engaging with, i.e. by disengaging from, the respective locking protrusion 203, 204. In other words, the open sections 105a, 105b each forms a section with a larger area than the cross-sectional area of the received locking protrusion 203, 204. By the disengaging receipt of the locking protrusion 203, 204, adjustment of the image sensor element 20 relative the locking arrangements in the image sensor plane, i.e. by movement in the X- and/or Y-directions and/or by rotation in the image sensor plane, is allowed. Thus, the image sensor element 20 may be adjusted by the stabilizer for sensor stabilization purposes.

In FIG. 3b, the elongated members 102, 104 are positioned relative each other such that the open sections 105a, 105b receive the locking protrusions 203, 204 and engage with each locking protrusion 203, 204. The open sections 105a, 105b each has an area which essentially corresponds to the cross-sectional area of the received part of the respective locking protrusion 203, 204. The area of the open section 105a, 105b may be larger than the cross-sectional area of the received part of the respective locking protrusion 203, 204, as long as linear movement of each of the locking protrusions in the X-direction, Y-direction or a combination thereof is prevented by that the locking protrusion is at least partly engaged by the locking arrangements.

By preventing the locking protrusions 203, 204 from linear movement in the image sensor plane, i.e. linear movement in the X-direction, Y-direction or a combination thereof, the image sensor element 20 is prevented from moving in the same manner.

By the locking protrusions 203, 204 being at least two in number, and by each locking protrusion 203, 204 being received in the open sections 105a, 105b by being engaged by the locking arrangements such that linear movement in the image sensor plane is prevented, also rotational movement of the image sensor element 20 in the image sensor plane is prevented.

Thus, both linear movement and rotational movement of the image sensor element 20 in the image sensor plane are prevented by the locking device 10 when the locking device 10 is arranged in the locked mode. The locking device 10 is efficient in locking the image sensor element 20 in that there is no need for one locking device for locking linear movement and one locking device for locking rotational movement of the image sensor element 20.

The locking arrangements of the locking device 10 are fixedly installed in the camera. This means that when the locking device 10 is arranged in the locked mode, the position of the image sensor element 20 is fixed relative the locking arrangements in the image sensor plane and thus moves with the rest of the camera. In the unlocked mode, adjustment of the image sensor element 20 relative the locking arrangements in the image sensor plane is allowed. A consequence of this, in view of the above disclosure on sensor stabilization, is that sensor stabilization is enabled when the locking device 10 is arranged in the unlocked mode and that sensor stabilization is disabled when the locking device is arranged in the locked mode.

The locked mode of the locking device 10 may also be utilized for locking the image sensor element in position during, e.g., mounting of the camera components. For example, with reference to the illustrated embodiment of FIG. 2, the board holder 202 (which comprises the locking protrusions 203, 204) may be locked in position, by adjusting the locking device 10 to the locked mode, while the image sensor board 201 is being mounted to the board holder 202.

The locked mode of the locking device 10 may also be utilized when transporting a device, such as a camera, containing the image sensor element. During transportation, it is unnecessary to enable movement of the image sensor element. The image sensor element may be position fixed by arranging the locking device 10 in the locked mode.

The locked mode of the locking device 10 may also be utilized when sensor stabilization is regarded as unnecessary, such as when the camera is arranged on a tripod.

The adjustment of the locking device 10 may be performed by use of powered actuators, such as a motor. However, when the locking device 10 has been adjusted to either one of the locked or unlocked mode, no powered actuator is necessarily required in order for the locking device 10 to remain in that mode. Hence, the design of the locking device 10 provides a power-efficient solution for providing a locked mode and an unlocked mode of the image sensor element 20, and contributes to minimization of heating in the camera.

The adjustment between the locked mode and the unlocked mode of the locking device 10 is easily achieved by a movement of the locking arrangements relative each other. In the embodiment of FIGS. 3a-3a, the adjustment between the unlocked mode (FIG. 3a) and the locked mode (FIG. 3b) is achieved by a motion of the elongated members 102, 104 relative each other mainly along the extension direction of the elongated members 102, 104. The motion of the elongated members 102, 104 relative each other is induced by a rotation of a fork element 400. The fork element 400 is coupled to a respective one of the elongated members 102, 104 by pins 401, 402. A rotational movement of the fork element 400 about a rotational axis 403 of the fork element 400 induces the motion of the elongated members 102, 104.

The locking device 10 may further comprise a motor 404 coupled to the fork element 400. The motor 404 is illustrated in FIG. 2. The motor 404 is arranged to actuate the rotation of the fork element 400 about the rotational axis 403. The motor 404 may be a stepper motor. An advantage provided by a stepper motor is the resistance of the stepper motor to actuate motion when the motor is inactive, i.e. not running. The resistance prevents undesired rotation of the fork element 400, and thereby movement of the elongated members 102, 104, due to for example movement of the camera. Since the resistance in the stepper motor is independent of whether the stepper motor is powered or not, the locking device 10 provides a locked mode which is reliable and power-efficient.

Returning to FIG. 2, the locking device 10 further comprises a support member 300. The support member 300 is provided for supporting the locking arrangements and for guiding the movement of the locking arrangements relative each other.

For these purposes, the support member 300 comprises at least one guiding protrusion which in this embodiment comprises a pair of guiding protrusions 301, 302. Each of the elongated members 102, 104 forming the locking arrangement, is provided with a groove. The first elongated member 102 is provided with a first groove 106 and the second elongated member is provided with a second groove 107. The elongated members 102, 104 are superimposed such that the first and second grooves 106, 107 at least partly overlap each other.

A common guiding groove 108 is formed by the common area of the at least partly overlapping first and second grooves 106, 107. The common guiding groove 108 is adapted to receive the pair of guiding protrusions 301, 302. Preferably, the elongated members 102, 104 are arranged such that the common guiding groove 108 at least partly engages with the guiding protrusions 301, 302. Moreover, by that the guiding protrusions 301, 302 are at least two in number and preferably spaced apart, rotation of the elongated members 102, 104 are prevented. Both these features increase the position stability of the elongated members 102, 104 and contribute to a well-defined guided movement of the elongated members 102, 104 relative each other.

For the above disclosed purposes of the support member 300, the support member 300 also comprises support protrusions 303, 304, 305, 306. The support protrusions 303, 304, 305, 306 define an area in which the elongated members 102, 104 are arranged. The support protrusions 303, 304, 305, 306 are arranged so as to limit the movement of the elongated members 102, 104 to a direction along the extension direction of the elongated members 102, 104.

It is appreciated that support of the locking arrangements and/or guiding of the locking arrangements may be provided in other ways as well. For example, the support member 300 may comprise a groove arranged such that the elongated members 102, 104 may slide relative each other in said groove. In one embodiment, the support member 300 comprises a guiding protrusion having an elongated cross-section and wherein the common guiding groove is elongated. The locking arrangements are in this embodiment arranged such that the guiding protrusion, when received in the common guiding groove, extends along the groove. The locking device is preferably arranged such that the locking arrangements engage with the guiding protrusion when received in the common guiding groove. The position stability of the locking arrangements is thus improved and the design of the locking device in this embodiment contributes to a well-defined guided movement of the locking arrangements relative each other. Moreover, by means of the elongation of the locking protrusion, rotation of the locking arrangements 102, 104 may be counteracted.

Returning to FIGS. 3a and 3b, the form of the locking holes 101a, 101b, 103a, 103b will now be discussed. The locking holes 101a, 101b, 103a, 103b are in this embodiment wedge-shaped. The locking holes 101a, 101b, 103a, 103b are arranged such that, in the locked mode of the locking device 10, the locking protrusions 203, 204 are received such that each locking protrusion 203, 204 is wedged in the respective locking hole 101a, 101b, 103a, 103b. In other words, the locking holes 101a, 101b, 103a, 103b are arranged such that the wedged sections of each locking hole overlap each other when the locking device 10 is arranged in the locked mode. The overlapping wedged sections thus define the open sections 105a, 105b in which the respective locking protrusion 203, 204 is received. By wedging the locking protrusions 203, 204 a firm engagement of the locking protrusions 203, 204 is achieved. The shape of the wedges is preferably adapted to the cross-sectional shape of the locking protrusions 203, 204.

Another advantage of the locking holes 101a, 101b, 103a, 103b being wedge-shaped is that the guiding protrusions 203, 204 are guided into the respective wedge when the locking arrangements are adjusted from the unlocked mode towards the locked mode. Thus, there is no need for any active guiding of the locking protrusions or of the locking arrangements.

Moreover, the position of the locking arrangements in the locking device 10 becomes well-defined in the locked mode thus providing a predetermined reference position which may be used when it is desirable to determine the position of components of the locking device 10 and/or the image sensor element 20.

It is appreciated that other shapes of the locking holes 101a, 101b, 103a, 103b may provide the above and/or other advantages and that the locking holes of the locking device are not limited to the ones illustrated in the drawings.

The locking arrangements have in the embodiments of FIGS. 1-3b been disclosed as each being formed by a single member. However, the locking arrangements may in other embodiments be formed by multiple members, which will be demonstrated later in this detailed description.

Moreover, the open sections have been illustrated as separate openings. However, it is appreciated that the open sections may in alternative embodiments be different parts of a common opening. Moreover, multiple open sections may be achieved by a single pair of overlapping locking holes depending on the form of the holes and how the locking arrangements overlap each other. For example, if locking holes 101a and 101b of the first elongated member 102 were to be connected such that a single locking hole is provided, and vice versa for the locking holes 103a and 103b, two open sections may still be provided by the overlapping of the locking arrangements. Moreover, the open sections may be different parts of an opening where the opening is formed by the common area of one or more overlapping pairs of locking holes.

Figure 4:
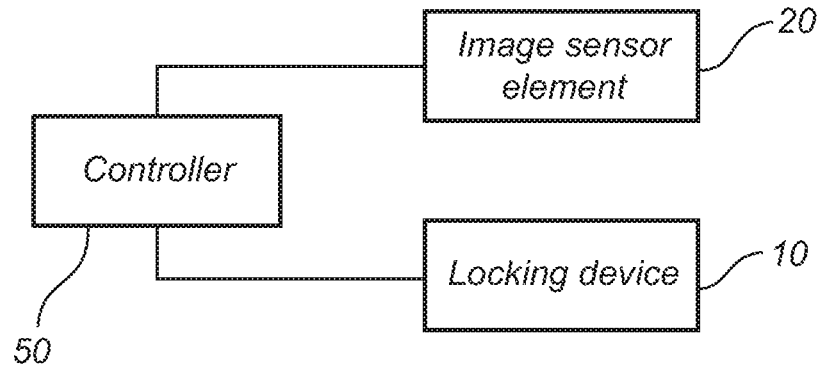
FIG. 4 is a schematic view of connections between a controller, an image sensor element and a locking device according to an embodiment.

The operational control of the adjustment of the locking device 10, according to an embodiment, will now be disclosed with further reference to FIG. 4. FIG. 4 schematically illustrates a controller 50 being operationally connected to the image sensor element 20. The controller 50 is also operationally connected to the locking device 10. The controller 50 is preferably located in the camera 1. The controller 50 may be operationally connected to other parts of the camera 1 as well, such as to an imaging lens module, to an illumination unit or to a display. The controller 50 may be provided in the form of a processor.

The controller 50 is arranged to control the adjustment of the locking device 10 between the locked mode and the unlocked mode. How the control is realized depends on how the movement of the locking arrangements of the locking device 10 is induced. For the embodiment of a locking device 10 as disclosed above, where the motor 404 actuates a rotation of the fork element 400 which in turn is coupled to and moves the locking arrangements relative each other, the controller 50 is operationally coupled to the motor 404 for adjustment of the locking device 10.

For the purpose of enabling and disabling sensor stabilization, the controller 50 may enable sensor stabilization by adjusting the locking device 10 to the unlocked mode and disable sensor stabilization by adjusting the locking device 10 to the locked mode. The controller 50 may also control the sensor stabilization by its connection to the image sensor element 20, optionally through an intermediate connection to a stabilizer which in turn is connected to the image sensor element 20. Thus, the controller 50 may activate sensor stabilization by firstly adjusting the locking device 10 to the unlocked mode and secondly activating sensor stabilization by its connection to the image sensor element 20.

The enablement/disablement of sensor stabilization may be controlled based on an evaluation of the need for such stabilization. In some situations, for example when the light intensity is high in a field of view of the camera (such as during daytime) or when it is desirable to reduce the power consumption in the camera, it may be desirable to disable sensor stabilization. For this purpose, the method according to FIG. 5 may be performed.

Firstly, an image stabilization parameter is determined 501.

The image stabilization parameter may represent a movement level of the camera. The movement level may be determined by a vibration sensor provided in the camera.

The image stabilization parameter may represent a power level of the camera. The power level may correspond to a current power level of a battery of the camera. The image stabilization parameter may alternatively represent a power mode corresponding to a selected power-reducing mode, said selection being made by, e.g., a user or predefined during manufacturing.

The image stabilization parameter may represent a light intensity in a field of view for the camera. The light intensity may be determined by a light intensity sensor provided in or in connection to the camera, or by analyzing image sensor data.

The image stabilization parameter may represent a time of day or night, for example the current time of the day or night or static representation 1/0 where 1 indicates that it is day and 0 indicates that it is night.

The image stabilization parameter may represent a user input, such as a manual input in a user interface of the camera that the sensor stabilization should be on or off.

The method further comprises comparing 502 the determined image stabilization parameter with a preset decision parameter.

Based on the comparison 502, sensor stabilization is enabled or disabled by adjusting the locking device of the camera to the unlocked mode or to the locked mode.

In an embodiment where the image stabilization parameter represents a power level, the preset decision parameter may represent a power level threshold below which sensor stabilization should be disabled. For example, if it is determined that the determined power level is below the power level threshold by comparison, sensor stabilization is disabled by adjusting the locking device to the locked mode.

In an embodiment where the image stabilization parameter represents a light intensity, the preset decision parameter may represent a light intensity threshold. It may be desired to disable sensor stabilization if light intensity in the field of view of the camera is higher than the threshold.

Sensor stabilization may not be necessary at higher light intensities since the shorter exposure time decreases the time frame during which shaking of the camera may occur.

For example, if it is determined that the determined light intensity is above the light intensity threshold by comparison, sensor stabilization is disabled by adjusting the locking device to the locked mode.

In an embodiment where the image stabilization parameter represents a time of day or night, the preset decision parameter may represent a time interval. It may be desired to disable sensor stabilization during the day when the light intensity is high and thus sensor stabilization is unnecessary, and vice versa it may be desired to enable sensor stabilization during the night. It may be desired to turn sensor stabilization off during the day also in order to minimize unnecessary heating in the camera. For example, if it is determined that the determined time of day or night lies within a time interval representing day time by comparison, sensor stabilization is disabled by adjusting the locking device to the locked mode.

In an embodiment where the image stabilization parameter represents a user input, the preset decision parameter may be a static value for which sensor stabilization is to be enabled or disabled. For example, if it is determined that the determined user input equals the static value representing enablement of sensor stabilization, sensor stabilization is enabled by adjusting the locking device to the unlocked mode.

Optionally, the method may further comprise enabling 504 electronic image stabilization if sensor stabilization is disabled. By this feature, at least one kind of image stabilization is always active which may improve the quality of the acquired image.

The method may further comprise disabling electronic image stabilization if sensor stabilization is enabled. Electronic image stabilization has the drawback of reducing the resolution of the digital image which is adjusted. This drawback is avoided by disabling electronic image stabilization. One type of image stabilization (optical or electronic) may however always be active.

In an alternative embodiment, electronic image stabilization is permanently active while sensor stabilization is enabled and disabled by the above exemplified method with process steps 501-503. In this embodiment, electronic image stabilization is combined with sensor stabilization when the latter is enabled.

Figure 5:
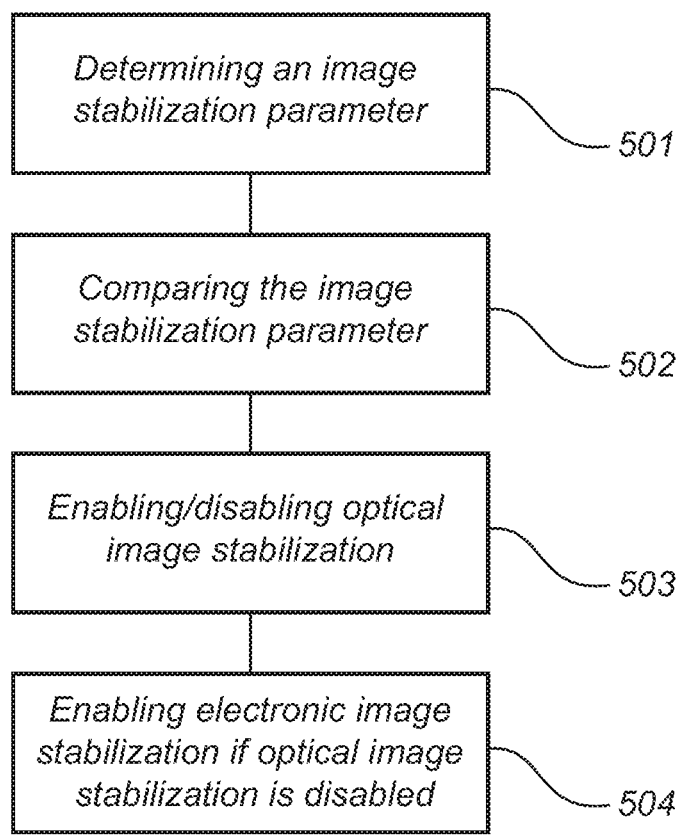
FIG. 5 illustrates a method for controlling image stabilization in a camera according to an embodiment.

The method of FIG. 5 may be implemented in a camera as an option of "Sensor stabilization—AUTO" which may be selected by a user by, e.g., user input in a user interface of the camera. Another selectable option may be "Sensor stabilization—ON" meaning that the sensor stabilization is always enabled and thus the locking device is always set in the unlocked mode when this option is selected. Another selectable option may be "Sensor stabilization—OFF" meaning that the sensor stabilization is always disabled and thus the locking device is always set in the locked mode when this option is selected.

The above disclosed method may be implemented in the controller 50 illustrated in FIG. 4. The method may alternatively be implemented in cameras having other control configurations than the one illustrated in FIG. 4.

Figure 6:
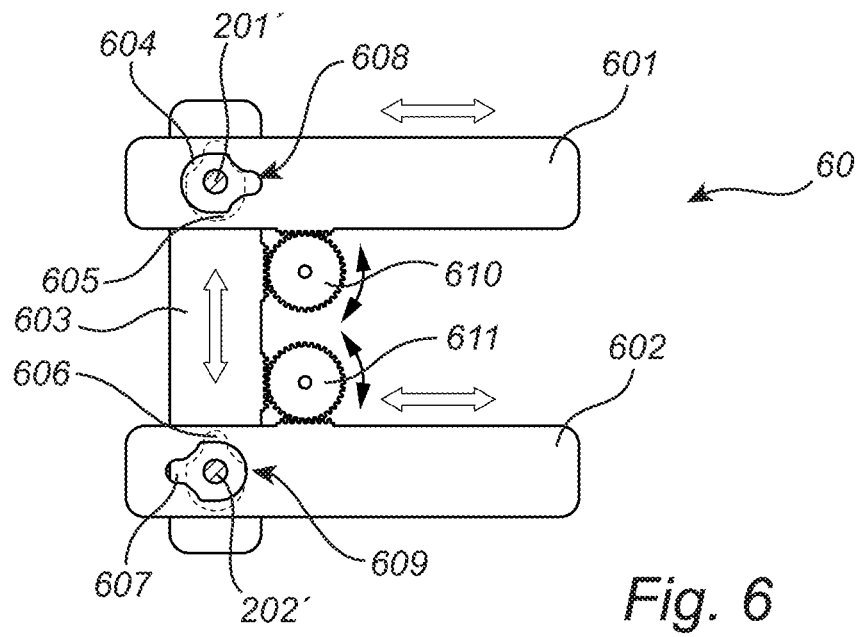
FIGS. 6-8 illustrate different embodiments of locking devices.
Figure 7:
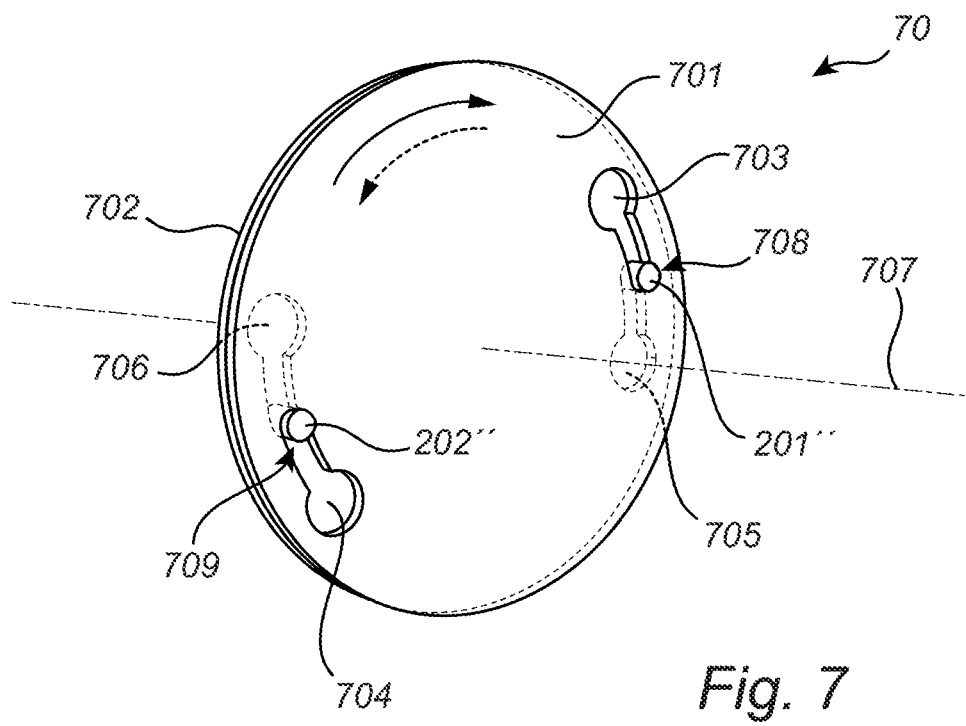
Figure 8:
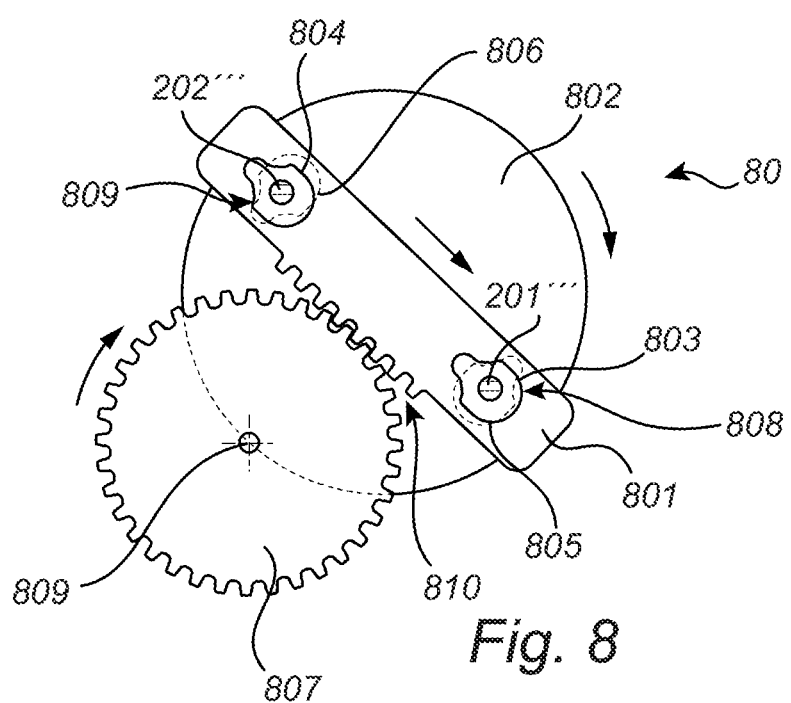

Alternative embodiments in view of the construction of the locking device will now be disclosed with reference to FIGS. 6-8. It is appreciated that a locking device according to any of the below disclosed embodiments may replace the locking device 10 of the above disclosed embodiments.

In FIG. 6, a locking device 60 is illustrated. The locking device 60 comprises two locking arrangements. A first locking arrangement comprises two elongated members 601, 602. A second locking arrangement comprises one elongated member 603. Each of the elongated members 601, 602 of the first locking arrangement is provided with one of two locking holes 604, 607. The elongated member 603 of the second locking arrangement is provided with two locking holes 605, 606.

The locking arrangements are superimposed such that the locking holes of the first and second locking arrangements at least partly overlap each other in pairs so as to form two open sections 608, 609. The open sections 608, 609 are adapted to receive a respective locking protrusion 201', 202' of an image sensor element.

The locking device 60 is adjustable between a locked mode and an unlocked mode by a motion of the first and second locking arrangements relative each other. In the locked mode, the elongated members 601, 602 of the first locking arrangement are shifted in a direction to the left and to the right, respectively, of FIG. 6, and the elongated member 603 of the second locking arrangement is shifted in a direction downwards of FIG. 6.

A first cog wheel 610 is connected to one of the elongated members 601 of the first locking arrangements and also to the elongated member 603 of the second locking arrangement. A second cog wheel 611 is connected to the other of the elongated members 602 of the first locking arrangement and also to the elongated member 603 of the second locking arrangement. The motion of the cog wheels 610, 611 relative each other may be actuated by a motor being connected to each or to both of the cog wheels 610, 611.

In FIG. 7, a locking device 70 is illustrated. The locking device 70 comprises two locking arrangements. Each locking arrangement comprises a circular disc 701, 702. Each of the circular discs 701, 702 is provided with a pair of locking holes 703, 704, 705, 706. The circular discs 701, 702 are superimposed such that the locking holes 703, 704, 705, 706 at least partly overlap each other in pairs. Two open sections 708, 709 are thus provided by the common overlapping area of the at least partly overlapping locking holes 703, 704, 705, 706. The open sections 708, 709 are each adapted to receive one of a pair of locking protrusions 201", 202" of an image sensor element. The locking device 70 is arranged in a locked mode in FIG. 7.

The circular discs 701, 702 are superimposed such that they share a common rotational axis 707. The locking device 70 is adjustable between a locked mode and an unlocked mode by a rotation of the circular discs 701, 702 relative each other and about the common rotational axis 707. The circular discs 701, 702 are rotated in different directions, i.e. one disc is rotated clockwise and the other disc is rotated counterclockwise. The rotational movement may be actuated by one motor being coupled to each of the circular discs 701, 702.

In FIG. 8, a locking device 80 is illustrated. The locking device 80 comprises two locking arrangements. A first locking arrangement comprises an elongated member 801. The elongated member 801 is provided with two locking holes 803, 804. A second locking arrangement comprises a circular disc 802. The circular disc 802 is provided with two locking holes 805, 806. The locking arrangements are superimposed such that the locking holes 803, 804, 805, 806 at least partly overlap each other in pairs. Two open sections 808, 809 are thus provided by the common overlapping area of the at least partly overlapping locking holes 803, 804, 805, 806. The open sections 808, 809 are each adapted to receive one of a pair of locking protrusions 201''', 202''' of an image sensor element.

The locking device 80 is adjustable between a locked mode and an unlocked mode by a motion of the first and second locking arrangements relative each other. The locking device 80 is arranged in an unlocked mode in FIG. 8. For adjustment to the locked mode, the elongated member 801 of the first locking arrangement is shifted in a direction downwards and to the right of FIG. 8, and the circular disc 802 of the second locking arrangement is shifted in a clockwise direction. The motion of the locking arrangements relative each other is actuated by a cog wheel 807. The cog wheel 807 is connected by its cogs to the elongated member 801. The cog wheel 807 is also connected to the circular disc 802 by a connecting element provided through the center axis 809 of the cog wheel 807. The connecting element is coupled to edge of the circular disc 802 such that a rotation of the cog wheel 807 rotates the connecting element whereby the circular disc 802 is rotated clockwise or counter clockwise. The cog wheel 807 may be rotated by means of a motor connected to the cog wheel 807.

The person skilled in the art realizes that the present invention may be embodied in many different forms and is not limited to the embodiments described above. On the contrary, many modifications and variations are possible within the scope of the appended claims. For example, one locking hole in a pair of overlapping locking holes may be provided as a groove in the locking arrangement, whereby the resulting open section forms an opening which does not extend throughout the locking arrangements. As exemplified by the illustrated embodiments, the locking device may have many different configurations. For example, the shape of the locking holes and resulting open sections can have various forms. It is also appreciated that the locking device may be utilized for providing a locked and an unlocked mode for a lens element in a camera, where the lens element is movable in the unlocked mode so as to enable lens-based stabilization.

What is claimed is:

1. A locking device for locking an image sensor element in a camera, the locking device comprising:
   two locking arrangements each provided with one or more locking holes;
   wherein the locking arrangements are superimposed such that said one or more locking holes of the locking arrangements at least partly overlap each other in pairs so as to form two open sections adapted to each receive a respective locking protrusion of said image sensor element;
   wherein the locking device is adjustable between a locked mode and an unlocked mode by a motion of the locking arrangements relative each other;
   wherein, in the locked mode, the open sections of the locking arrangements are adapted to receive the respective locking protrusion such that the locking arrangements engage with each locking protrusion for locking the position of the image sensor element relative the locking arrangements in an image sensor plane of the image sensor element; and
   wherein, in the unlocked mode, the open sections of the locking arrangements are adapted to receive the respective locking protrusion such that the locking arrangements are disengaged from the respective locking protrusion for allowing adjustment of the position of the image sensor element relative the locking arrangements in the image sensor plane of the image sensor element.

2. The locking device according to claim 1,
   wherein the one or more locking holes are wedge-shaped; and
   wherein, in the locked mode, the open sections are adapted to receive the respective locking protrusion such that each locking protrusion is wedged in the respective locking hole of each of the overlapping locking holes.

3. The locking device according to claim 1, wherein the locking device further comprises:
   a support member comprising at least one guiding protrusion;
   wherein the locking arrangements are provided with a groove each;
   wherein the locking arrangements are superimposed such that the grooves at least partly overlap each other so as to form a common guiding groove adapted to receive the at least one guiding protrusion; and
   wherein the locking arrangements are adapted to engage with the at least one guiding protrusion when received in the common guiding groove.

4. The locking device according to claim 3,
   wherein the at least one guiding protrusion is elongated so as to extend along the common guiding groove when received in said common guiding groove.

5. The locking device according to claim 1,
   wherein the respective locking protrusion protrudes from the image sensor element mainly orthogonal to the image sensor plane.

6. The locking device according to claim 1,
   wherein the respective locking protrusions is formed by locking pins.

7. The locking device according to claim 1,
   wherein each locking arrangement is formed by an elongated member; and
   wherein the locking arrangements are arranged such that the locking device is adjustable between the locked mode and the unlocked mode by a motion of the elongated members relative each other mainly along their extension direction.

8. The locking device according to claim 7, wherein the locking device further comprises:
   a fork element having two prongs,
   wherein each prong is coupled to a respective one of the locking arrangements such that the locking device is adjustable between the locked mode and the unlocked mode by a rotation of the fork element about a rotational axis of the fork element.

9. The locking device according to claim 8, the locking device further comprising a motor coupled to the fork element for rotation of said fork element.

10. A camera comprising:
    an image sensor element; and
    a locking device, the locking device comprising:
    two locking arrangements each provided with one or more locking holes;
    wherein the locking arrangements are superimposed such that said one or more locking holes of the locking arrangements at least partly overlap each other in pairs so as to form two open sections adapted to each receive a respective locking protrusion of said image sensor element;
    wherein the locking device is adjustable between a locked mode and an unlocked mode by a motion of the locking arrangements relative each other;
    wherein, in the locked mode, the open sections of the locking arrangements are adapted to receive the respective locking protrusion such that the locking arrangements engage with each locking protrusion for locking the position of the image sensor element relative the locking arrangements in an image sensor plane of the image sensor element; and
    wherein, in the unlocked mode, the open sections of the locking arrangements are adapted to receive the respective locking protrusion such that the locking arrangements are disengaged from the respective locking protrusion for allowing adjustment of the position of the image sensor element relative the locking arrangements in the image sensor plane of the image sensor element.

11. The camera according to claim 10,
    wherein the image sensor element comprises a board holder from which the locking protrusions protrude; and
    wherein an image sensor board is mountable on said board holder.

12. The camera according to claim 10, wherein the camera further comprises a controller operationally coupled to the locking device for enabling and disabling sensor stabilization by controlling the adjustment of the locking device between the unlocked mode and the locked mode.

13. A method for controlling image stabilization in a camera the method comprising:
providing a locking device including:
two locking arrangements each provided with one or more locking holes;
wherein the locking arrangements are superimposed such that said one or more locking holes of the locking arrangements at least partly overlap each other in pairs so as to form two open sections adapted to each receive a respective locking protrusion of said image sensor element;
wherein the locking device is adjustable between a locked mode and an unlocked mode by a motion of the locking arrangements relative each other;
wherein, in the locked mode, the open sections of the locking arrangements are adapted to receive the respective locking protrusion such that the locking arrangements engage with each locking protrusion for locking the position of the image sensor element relative the locking arrangements in an image sensor plane of the image sensor element; and
wherein, in the unlocked mode, the open sections of the locking arrangements are adapted to receive the respective locking protrusion such that the locking arrangements are disengaged from the respective locking protrusion for allowing adjustment of the position of the image sensor element relative the locking arrangements in the image sensor plane of the image sensor element;
determining an image stabilization parameter;
comparing the image stabilization parameter with a preset decision parameter; and
based on said comparison, enabling sensor stabilization by adjusting the locking device to the unlocked mode or disabling sensor stabilization by adjusting the locking device to the locked mode.

14. The method according to claim 13, wherein the image stabilization parameter represents one or more of the following: movement level of the camera, power level of the camera, light intensity in a field of view for the camera, time of day or night, user input.

15. The method according to claim 14, further comprising:
if the sensor stabilization is disabled based on said comparison, enabling electronic image stabilization.

* * * * *